(12) United States Patent
Park et al.

(10) Patent No.: US 9,041,633 B2
(45) Date of Patent: May 26, 2015

(54) ORGANIC LIGHT EMITTING DISPLAY DEVICE

(75) Inventors: Kyong-Tae Park, Yongin (KR); Byoung-Seong Jeong, Yongin (KR); Mu-Gyeom Kim, Yongin (KR); Chang-Mo Park, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 742 days.

(21) Appl. No.: 12/940,912

(22) Filed: Nov. 5, 2010

(65) Prior Publication Data

US 2011/0227505 A1   Sep. 22, 2011

(30) Foreign Application Priority Data

Mar. 17, 2010   (KR) ......................... 10-2010-0023758

(51) Int. Cl.
 *H05B 33/08* (2006.01)
 *G09G 3/32* (2006.01)

(52) U.S. Cl.
 CPC .......... *H05B 33/0896* (2013.01); *G09G 3/3233* (2013.01); *G09G 2320/0295* (2013.01); *G09G 2320/043* (2013.01)

(58) Field of Classification Search
 USPC .......................................................... 345/82
 See application file for complete search history.

(56) References Cited

U.S. PATENT DOCUMENTS

| | | | | |
|---|---|---|---|---|
| 2008/0094320 A1* | 4/2008 | Parikh et al. | ..................... | 345/76 |
| 2008/0186301 A1* | 8/2008 | Park et al. | ..................... | 345/211 |
| 2008/0252569 A1* | 10/2008 | Kwon | ............................. | 345/76 |
| 2008/0252570 A1* | 10/2008 | Kwon | ............................. | 345/76 |
| 2009/0051628 A1* | 2/2009 | Kwon | ............................. | 345/77 |
| 2009/0184896 A1* | 7/2009 | Kwon | ............................. | 345/76 |
| 2009/0184903 A1* | 7/2009 | Kwon | ............................. | 345/80 |

FOREIGN PATENT DOCUMENTS

| KR | 10-2007-0110263 | 11/2007 |
|---|---|---|
| KR | 10-0846969 B1 | 7/2008 |
| KR | 10-0846970 | 7/2008 |
| KR | 10-2010-021482 A | 2/2010 |

OTHER PUBLICATIONS

KIPO Office Action dated Sep. 23, 2011 for KR Application No. 10-2010-0023758 (1 page) noting references in the IDS as well as KR 10-0846970 previously submitted in an IDS of Nov. 5, 2010.

* cited by examiner

*Primary Examiner* — David D Davis
(74) *Attorney, Agent, or Firm* — Christie, Parker & Hale, LLP

(57) ABSTRACT

An organic light emitting display device includes a display unit having pixels located at crossing regions of scan, control, data and sensing lines. Scan, control line, and data drivers respectively supply scan, control, and data signals to the scan, control, and data lines. A switching unit selectively couples the data lines to output lines of the data driver, a reference voltage source, or a negative bias voltage source. A sensing unit senses degradation information of an organic light emitting diode in the pixels and threshold voltage of a driving transistor in the pixels through the sensing lines. A control block stores the sensed degradation information and threshold voltage information. A timing controller is configured to generate a second data by converting an externally inputted first data using the degradation information and the threshold voltage information, and supply the second data to the data driver.

15 Claims, 9 Drawing Sheets

ORGANIC LIGHT EMITTING DISPLAY DEVICE

CROSS-REFERENCE TO RELATED APPLICATIONS

This application claims priority to and the benefit of Korean Patent Application No. 10-2010-0023758, filed on Mar. 17, 2010, in the Korean Intellectual Property Office, the entire content of which is incorporated herein by reference.

BACKGROUND

1. Field

An aspect of embodiments according to the present invention relates to an organic light emitting display device.

2. Description of Related Art

Recently, there have been developed various types of flat panel display devices that are lighter in weight and smaller in volume than cathode ray tubes.

Among these flat panel display devices, an organic light emitting display device displays images using organic light emitting diodes (OLEDs) that are self-luminescent elements. The organic light emitting display device has come into the spotlight as a next-generation display device because of its excellent luminance and color purity.

Organic light emitting display devices can be classified as a passive matrix type organic light emitting display device or an active matrix type organic light emitting display device, depending on a method of driving the OLEDs.

Among these organic light emitting display devices, the active matrix type organic light emitting display device is used in portable display devices and the like because of its low power consumption.

Each pixel of the active matrix type organic light emitting display device includes an OLED, a switching transistor for driving the OLED, a driving transistor, a storage capacitor, and may also include other components.

However, the active matrix type organic light emitting display device might not display an image with desired luminance due to a luminance difference between pixels, which may occur due to a drift of threshold voltages of driving transistors, and due to the efficiency change according to the degradation of the OLED.

Because a turn-on state of the driving transistor is continuously maintained by a voltage stored in the storage capacitor during the light emitting period of the pixel after application of a data voltage, the drift of the threshold voltage of the driving transistor may be caused by the gradual degradation of the driving transistor. Therefore, the drift of the threshold voltage of the driving transistor may become a factor that causes the operation of the driving transistor to be unstable.

SUMMARY

In one embodiment, there is provided an organic light emitting display device capable of displaying an image with uniform luminance and stabilizing the threshold voltages of driving transistors by compensating for a drift of the threshold voltages of the driving transistors and the degradation of OLEDs.

According to an aspect of an embodiment according to the present invention, there is provided an organic light emitting display device including a display unit having a plurality of pixels located at crossing regions of scan lines, control lines, data lines and sensing lines, each of the pixels including an organic light emitting diode and a driving transistor, a scan driver configured to supply scan signals to the scan lines, a control line driver configured to supply control signals to the control lines, a data driver configured to supply data signals to the data lines, a switching unit configured to selectively couple the data lines to output lines of the data driver, a reference voltage source, or a negative bias voltage source, a sensing unit configured to sense degradation information of the organic light emitting diode and threshold voltage information of the driving transistor through the sensing lines, a control block configured to store the degradation information of the organic light emitting diode and the threshold voltage information of the driving transistor, sensed by the sensing unit, and a timing controller configured to generate second data by converting externally supplied first data using the degradation information of the organic light emitting diode and the threshold voltage information of the driving transistor and to supply the second data to the data driver, wherein one frame period is divided into a display subframe period and a black subframe period, during the display subframe period, an image is displayed corresponding to a corresponding data signal of the data signals generated from the second data, and the degradation information of the organic light emitting diode of each of the pixels on a selected horizontal line is sensed, and during the black subframe period, the threshold voltage information of the driving transistor of each of the pixels on the selected horizontal line is sensed, and a negative bias voltage of the negative bias voltage source or a turn-off voltage of the driving transistor is supplied to a gate electrode of the driving transistor of each of the pixels on other horizontal lines.

The pixels on each horizontal line may be sequentially selected every one frame period, and the degradation information of the organic light emitting diode of each of the pixels of the selected horizontal line and the threshold voltage information of the driving transistor of each of the pixels of the selected horizontal line may be sensed during the display subframe period and the black subframe period of the one frame period corresponding to the selected horizontal line.

The organic light emitting diode may be coupled between a first power source and a second power source, and the driving transistor may be coupled between the first power source and the organic light emitting diode, the gate electrode of the driving transistor may be coupled to a first node, and the organic light emitting display device may further include a second transistor coupled between the first node and a corresponding data line of the data lines, the second transistor having a gate electrode coupled to a corresponding scan line of the scan lines, a storage capacitor coupled between the first node and the first power source, and a third transistor coupled between an anode electrode of the organic light emitting diode and a corresponding sensing line of the sensing lines, the third transistor having a gate electrode coupled to a corresponding control line of the control lines.

Each of the pixels may emit light with luminance corresponding to the corresponding data signal supplied during the display subframe period, and the third transistor of each of the pixels on the selected horizontal line may be turned on in response to a corresponding control signal of the control signals supplied from the corresponding control line during the display subframe period, and a voltage applied to the anode electrode of the organic light emitting diode via the third transistor may be applied to the sensing unit.

The second transistor and the third transistor of each of the pixels on the selected horizontal line may be turned on in response to a corresponding scan signal of the scan signals and the corresponding control signal respectively supplied from the scan lines and the control lines during the black subframe period so that the driving transistor may be turned on by respectively supplying a reference voltage of the reference voltage source and an initialization voltage of an initialization voltage source to the gate electrode and the source electrode of the driving transistor and after the driving transistor is turned on, the source electrode of the driving transistor may be floated and then coupled to the sensing unit via the corresponding sensing line by the third transistor after a difference between voltages of the gate electrode and the source electrode of the driving transistor becomes a threshold voltage of the driving transistor.

A difference between the initialization voltage of the initialization voltage source and the reference voltage of the reference voltage source may be greater than the threshold voltage of the driving transistor.

A voltage lower than that obtained by adding a voltage of the second power source and a threshold voltage of the organic light emitting diode may be applied to the anode electrode of the organic light emitting diode during the black subframe period.

The second transistor of each of the pixels on horizontal lines other than the selected horizontal line may be configured to be turned on corresponding to a corresponding scan signal of the scan signals supplied from the corresponding scan line during the black subframe period so that the voltage of the negative bias voltage source or the turn-off voltage of the driving transistor may be applied to the first node.

The driving transistor may be an N-type oxide thin film transistor.

The voltage of the negative bias voltage source may be a negative voltage.

A channel of the switching unit may include a first switch coupled between a corresponding data line of the data lines and an output line of the data driver, a second switch coupled between the corresponding data line and the reference voltage source, and a third switch coupled between the corresponding data line and the negative bias voltage source.

The first switch may be turned on during the display subframe period in which the corresponding data signal is supplied to the pixels.

The second switch may be turned on during the black subframe period in which the threshold voltage information of the driving transistor is sensed.

After it is sensed that the threshold voltage of the driving transistor is deviated from a range of a reference threshold voltage, the third switch may be turned on every black subframe period until the black subframe period in which the threshold voltage information of the driving transistor of the pixel including the third switch is sensed.

After it is determined that the sensed threshold voltage of the driving transistor is within a range of a reference threshold voltage, the third switch may be turned off every black subframe period until the black subframe period in which the threshold voltage information of the driving transistor of the pixel including the third switch is sensed.

A channel of the sensing unit may include a fourth switch coupled between a corresponding sensing line of the sensing lines and the initialization voltage source, a fifth switch coupled between the corresponding sensing line and the control block, and an analog-digital converter (ADC) coupled between the fifth switch and the control block.

The fourth switch may be turned on during an initial period of the black subframe period in which the threshold voltage information of the driving transistor is sensed by the sensing unit via the corresponding sensing line.

The fifth switch may be turned on after a turn-on period of the fourth switch during the black subframe period in which the threshold voltage information of the driving transistor is sensed, and may remain turned on during the display subframe period in which the degradation information of the organic light emitting diode is sensed by the sensing unit via the corresponding sensing line.

The sensing unit may be configured to sense a voltage at the anode electrode of the organic light emitting diode and the threshold voltage of the driving transistor through the sensing lines, and may be configured to output them respectively as a first digital value and a second digital value to the control block, and the control block may include a lookup table configured to store a reference value for current versus voltage of the organic light emitting diode, and a controller configured to extract the degradation information of the organic light emitting diode corresponding to the first digital value sensed from the sensing unit with reference to the lookup table to transmit the degradation information to the timing controller and transmit the second digital value to the timing controller.

The timing controller may include a memory configured to store the degradation information of the organic light emitting diode and the threshold voltage information of the driving transistor, and a converting circuit configured to convert the first data into the second data using the degradation information of the organic light emitting diode and the threshold voltage information of the driving transistor.

As described above, according to one embodiment according to the present invention, a frame period includes a display subframe period and a black subframe period. During the display subframe period, an image is displayed, and a degree of the degradation of OLEDs is sensed and stored. During the black subframe period, the threshold voltages of driving transistors are sensed and stored. A data is converted so that the degradation of the OLEDs and the drift of the threshold voltages of the driving transistors can be compensated for, and data signals are generated corresponding to the converted data. Accordingly, an image with uniform luminance can be displayed regardless of the degradation of the OLEDs and the drift of the threshold voltages of the driving transistors.

Further, when the sensed threshold voltage of the driving transistors is deviated from the range of a reference value (e.g., a predetermined reference value) during the black subframe period, a negative bias voltage (e.g., a predetermined negative bias voltage) is applied to gate electrodes of the driving transistors every black subframe period until a next period in which the threshold voltages of the driving transistors of a corresponding horizontal line are sensed. Accordingly, the threshold voltages of the driving transistors are stabilized, and thus, pixels can be driven more stably.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
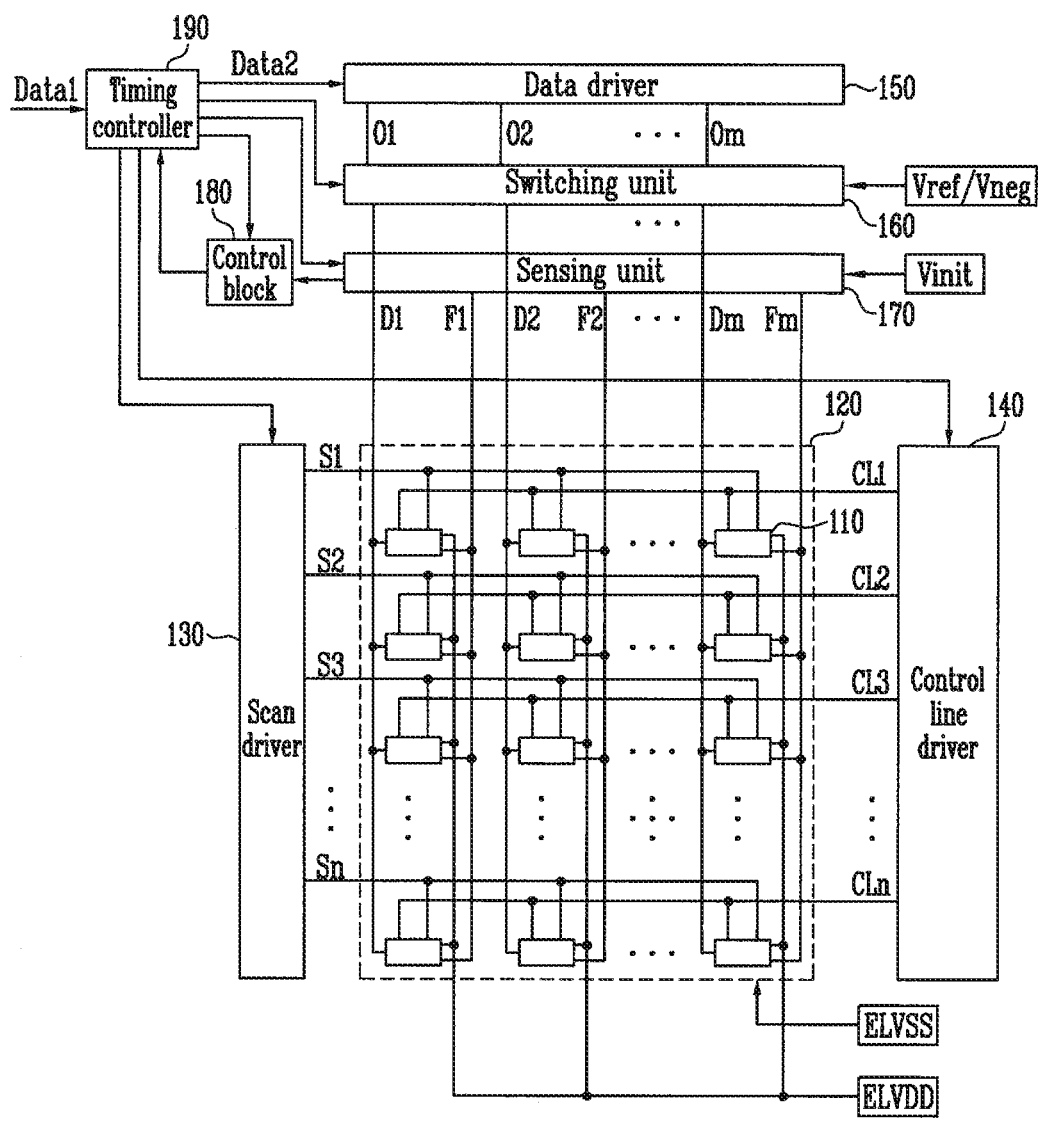
FIG. 1 is a block diagram of an organic light emitting display device according to one embodiment of the present invention.

Hereinafter, certain exemplary embodiments according to the present invention will be described with reference to the accompanying drawings. Here, when a first element is described as being coupled to a second element, the first element may be directly coupled to the second element or may be indirectly coupled to the second element via one or more other elements. Further, some of the elements that are not essential to a complete understanding of the invention are omitted for clarity. Also, like reference numerals refer to like elements throughout. Hereinafter, exemplary embodiments of the present invention are described in detail with reference to FIGS. 1 to 8.

FIG. 1 is a block diagram of an organic light emitting display device according to one embodiment of the present invention.

Referring to FIG. 1, the organic light emitting display device according to one embodiment of the present invention includes a display unit 120, a scan driver 130, a control line driver 140, a data driver 150, a switching unit 160, a sensing unit 170, a control block 180, and a timing controller 190.

The display unit 120 has a plurality of pixels 110 located at crossing regions of scan lines S1 to Sn, control lines CL1 to CLn, data lines D1 to Dm, and sensing lines F1 to Fm. The display unit 120 receives an externally supplied first power from a first power source ELVDD and an externally supplied second power from a second power source ELVSS, and transfers them to each of the pixels 110.

Each of the pixels 110 includes an organic light emitting diode (e.g., OLED shown in FIGS. 3-7) and a pixel circuit (e.g., shown in FIGS. 3-7) for driving the OLED. The pixels 110 emit light with luminance corresponding to current supplied from the first power source ELVDD to the second power source ELVSS via the OLEDs in response to data signals supplied from the data lines D1 to Dm, thereby displaying an image.

The scan driver 130 generates scan signals under the control of the timing controller 190, and supplies (e.g., sequentially supplies) the generated scan signals to the scan lines S1 to Sn.

The control line driver 140 supplies control signals to the control lines CL1 to CLn under the control of the timing controller 190. For example, the control line driver 140 may sequentially supply the control signals to the control lines CL1 to CLn so that one horizontal line is selected every frame period.

The data driver 150 generates data signals under the control of the timing controller 190, and supplies the generated data signals to the data lines D1 to Dm. For example, the data driver 150 generates data signals using a second data Data2 converted by the timing controller 190, and supplies the generated data signals to the pixels 110 through the data lines D1 to Dm. Then, the pixels 110 emit light with luminance corresponding to the data signals.

The switching unit 160 selectively couples the data lines D1 to Dm to output lines O1 to Om of the data driver 150, to a reference voltage source Vref, or to a negative bias voltage source Vneg. To this end, the switching unit 160 has at least three switches (shown in FIG. 4, for example) coupled to each channel of the data lines D1 to Dm.

The sensing unit 170 senses degradation information of the OLED included in each of the pixels 110 and threshold voltage information of driving transistors (e.g., M1, shown in FIGS. 3-7) included in each of the pixels 110 through the sensing lines F1 to Fm, and transmits them to the control block 180.

The control block 180 stores the degradation information of the OLEDs and the threshold voltage information of the driving transistors as sensed by the sensing unit 170 in a memory (e.g., 191, shown in FIGS. 4-7) included in the timing controller 190. For convenience of illustration, it has been illustrated in FIG. 1 that the control block 180 is a component separated from the timing controller 190. However, the control block 180 may be included in the timing controller 190.

The timing controller 190 controls the scan driver 130, the control line driver 140, the data driver 150, the switching unit 160, the sensing unit 170, the control block 180, and the like while supplying control signals to them.

The timing controller 190 generates a second data Data2 by converting an externally inputted first data Data1 using the degradation information of the OLEDs and the threshold voltage information of the driving transistors as extracted from the sensing unit 170 via the control block 180, and supplies the generated second data Data2 to the data driver 150.

To this end, the timing controller 190 includes a memory for storing the degradation information of the OLEDs and the threshold voltage information of the driving transistors as supplied from the sensing unit 170, and a converting circuit for converting the externally inputted first data Data1 of the timing controller 190 into the second data Data2 so that an image with uniform luminance can be displayed using the information stored in the memory, regardless of a degree of the degradation of the OLEDs or a drift of the threshold voltages of the driving transistors.

Figure 2:
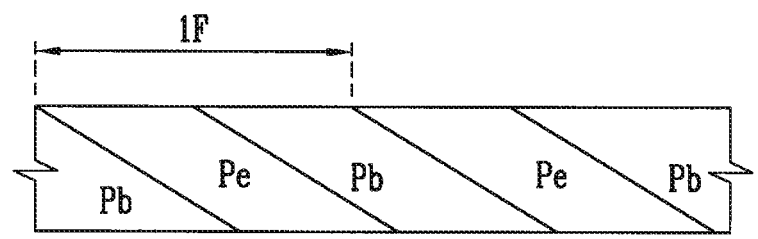
FIG. 2 is a view schematically showing a frame period according to the embodiment of the present invention shown in FIG. 1.

FIG. 2 is a view schematically showing a frame period according to the embodiment of the present invention shown in FIG. 1.

Referring to FIG. 2, in one embodiment of the present invention, a frame period 1F is divided into a display subframe period Pe and a black subframe period Pb. For convenience of illustration, it has been illustrated in FIG. 2 that the length of the display subframe period Pe is identical to that of the black subframe period Pb. However, the time distribution for the display subframe period Pe and the black subframe period Pb may be different in other embodiments (e.g., changed by the system designer).

More specifically, the display subframe period Pe is a period in which pixels 110 on each horizontal line receive (e.g., sequentially receive) data signals supplied from the data driver 150 and emit light with luminance corresponding to the data signals, thereby displaying an image. For example, in one embodiment of the present invention, degradation information of the OLED of each of the pixels 110 is also extracted during the display subframe period Pe.

At this time, the pixels 110 on the horizontal lines receive (e.g., sequentially receive) data signals supplied from the data driver 150 and emit light with luminance corresponding to the data signals during the display subframe period Pe. The extraction of the degradation information of the OLEDs may be made in such a manner that it is performed with respect to only pixels 110 located on one horizontal line during one display subframe period Pe and with respect to only pixels 110 located on the next horizontal line during the next display subframe period Pe.

That is, pixels 110 on one horizontal line are selected (e.g., sequentially selected) every frame period 1F, and degradation information of the OLED of each of the selected pixels 110 on the horizontal line is sensed during a display subframe period Pe of a corresponding frame period 1F.

During the display subframe period Pe, an image is displayed while the pixels 110 emit light with luminance corresponding to the data signals, and the degradation information of the OLED of each of the pixels 110 on the horizontal line, which is selected in the corresponding frame period 1F, is sensed.

The black subframe period Pb is a period in which the pixels 110 do not emit light. For example, during the black subframe period Pb, threshold voltage information of the driving transistors of the pixels 110 on the horizontal line selected in the corresponding frame period 1F is sensed, and the voltage Vneg of the negative bias voltage source or the turn-off voltage of the driving transistor is supplied to gate electrodes of driving transistors of pixels 110 on the other horizontal lines.

That is, like the extraction of the degradation information of the OLEDs, the sensing of the threshold voltage information of the driving transistors may be made in such a manner that it is performed with respect to only pixels 110 located on one horizontal line during one black subframe period Pb and with respect to only pixels 110 located on the next horizontal line during the next black subframe period Pb.

At this time, when the voltage Vneg of the negative bias voltage source is supplied to gate electrodes of driving transistors of at least some of the pixels 110 on the other horizontal lines, the degradation of the driving transistors is compensated for, and thus, the threshold voltage of the driving transistor is stabilized. On the other hand, when the voltage Vneg of the negative bias voltage source is not supplied to the gate electrodes of the driving transistors, a turn-off voltage is supplied to the gate electrodes of the driving transistors so that the driving transistors maintain a turn-off state.

As described above, according to one embodiment of the present invention, a frame period 1F includes a display subframe period Pe and a black subframe period Pb. During the display subframe period Pe, an image is displayed, and a degree of the degradation of the OLEDs is sensed and stored. During the black subframe period Pb, a drift of the threshold voltages of the driving transistors is sensed and stored.

The second data Data2 is generated by converting the externally inputted first data Data1, and the data signals are generated corresponding to the second data Data2 so that the degree of the degradation of the OLEDs and the drift of the threshold voltages of the driving transistors can be compensated for.

Accordingly, an image with uniform luminance can be displayed regardless of the degree of the degradation of the OLEDs and the drift of the threshold voltages of the driving transistors.

In one embodiment of the present invention, when the threshold voltages of the driving transistors on a corresponding horizontal line as sensed during the black subframe period Pb is deviated from a reference value (e.g., a predetermined reference value), a negative bias voltage (e.g., a predetermined negative bias voltage) Vneg is applied to gate electrodes of driving transistors of corresponding pixels 110 every black subframe period Pb until the next time the threshold voltages of driving transistors of a corresponding horizontal line are sensed, thereby compensating for the degradation of the driving transistors.

Accordingly, the threshold voltages of the driving transistors are stabilized and the pixels 110 can be stably driven.

Thus, one embodiment of the present invention can be usefully applied to amorphous silicon thin film transistors, oxide thin film transistors, and/or the like, which may have a large change in threshold voltage as time elapses.

Meanwhile, it has been described in one embodiment of the present invention that a frame period 1F includes a display subframe period Pe and a black subframe period Pb. However, each of the display subframe period Pe and the black subframe period Pb may be considered to be a frame period 1F. In this case, the display subframe period Pe and the black subframe period Pb may be alternately disposed every frame period 1F.

The driving method of the organic light emitting display device during the display subframe period Pe and the black subframe period Pb will be described in detail later.

Figure 3:
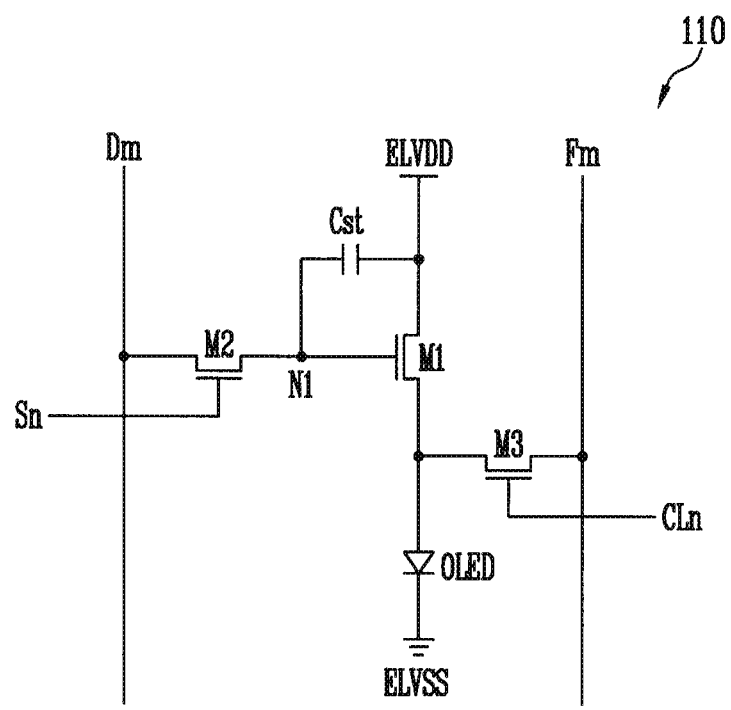
FIG. 3 is a circuit diagram showing a pixel of the embodiment of the present invention shown in FIG. 1.

FIG. 3 is a circuit diagram showing a pixel 110 of one embodiment according to the present invention shown in FIG. 1. For convenience of illustration, a pixel 110 coupled to an $m^{th}$ data line Dm and an $n^{th}$ scan line Sn will be described.

Referring to FIG. 3, the pixel 110 according to one embodiment of the present invention includes an OLED coupled between a first power source ELVDD and a second power source ELVSS; a driving transistor M1 (which may also be referred to as a "first transistor") coupled between the first power source ELVDD and the OLED; a second transistor M2 coupled between the data line Dm and a gate electrode of the driving transistor M1; a storage capacitor Cst coupled between the gate electrode of the driving transistor M1 and the first power source ELVDD; and a third transistor M3 coupled between an anode electrode of the OLED and a sensing line Fm.

More specifically, the OLED is coupled between the first power source ELVDD, which may be a high-potential pixel power source, and the second power source ELVSS, which may be a low-potential pixel power source, and emits light with luminance corresponding to current supplied from the driving transistor M1.

A drain electrode of the driving transistor M1 is coupled to the first power source ELVDD, and a source electrode of the driving transistor M1 is coupled to the anode electrode of the OLED. The gate electrode of the driving transistor M1 is coupled to the second transistor M2 and the storage capacitor Cst at a first node N1.

The driving transistor M1 controls the amount of current supplied to the OLED in accordance with the voltage applied to the first node N1. The driving transistor M1 controls the amount of current that flows from the first power source ELVDD to the second power source ELVSS via the OLED in accordance with the voltage stored in the storage capacitor Cst. The OLED emits light with luminance corresponding to the amount of the current supplied from the driving transistor M1.

A drain electrode of the second transistor M2 is coupled to the data line Dm, and a source electrode of the second transistor M2 is coupled to the driving transistor M1 and the storage capacitor Cst at the first node N1. A gate electrode of the second transistor M2 is coupled to the scan line Sn.

When a scan signal is supplied to the scan line Sn, the second transistor M2 is turned on. In one embodiment, the scan signal is supplied so that the second transistor M2 is turned on during the display subframe period Pe in which a data signal is stored in the storage capacitor Cst and the black subframe period Pb in which the threshold voltage information of the driving transistor M1 is sensed.

The storage capacitor Cst is coupled between the first power source ELVDD and the node N1 to which the first and second transistors M1 and M2 are coupled. The storage capacitor Cst is charged with a voltage corresponding to the voltage applied to the first node N1.

At this time, the storage capacitor Cst is coupled between the first node N1 and the first power source ELVDD, and therefore, a problem due to coupling is not caused during a period in which threshold voltage information of the driving transistor M1 is sensed in the black subframe period Pb.

That is, in this embodiment of the present invention, the storage capacitor Cst is not coupled between the gate and source electrodes of the driving transistor M1, but coupled between the gate and drain electrodes of the driving transistor M1 so that the threshold voltage information of the driving transistor M1 can be stably sensed.

A drain electrode of the third transistor M3 is coupled to the anode electrode of the OLED, and a source electrode of the third transistor M3 is coupled to the sensing line Fm. A gate electrode of the third transistor M3 is coupled to a control line CLn.

The third transistor M3 is turned on when a control signal is supplied to the control line CLn, and is turned off otherwise. In one embodiment, the control signal is supplied so that the third transistor M3 is turned on during a period in which the degradation information of the OLED is sensed in the display subframe period Pe and during a period in which the voltage Vinit of an initialization voltage source is supplied to the source electrode of the driving transistor M1 and a period in which the threshold voltage information of the driving transistor M1 is sensed in the black subframe period Pb.

Here, the driving, second, and third transistors M1, M2, and M3 may be N-type oxide thin film transistors, i.e., thin film transistors in which an active layer is formed of an oxide semiconductor.

In this case, the thin film transistors provide more enhanced properties than thin film transistors using amorphous silicon (a-Si) or poly-crystalline silicon (poly-Si). Unlike low temperature poly-silicon (LTPS) thin film transistors, the thin film transistors do not require a separate crystallization process for crystallizing an active layer, as the active layer can be grown by sputtering, and may be easily manufactured on a large scale using previously developed methods.

However, the present invention is not necessarily limited thereto. For example, the driving, second, and third transistors M1, M2, and M3 may be P-type LIPS thin film transistors and/or the like, in other embodiments.

When a scan signal is supplied to the scan line Sn during the display subframe period Pe, the pixel 110 receives a data signal supplied from the data line Dm and emits light with luminance corresponding to the data signal.

In the case where the corresponding frame period is a period in which the degradation information of the OLEDs of pixels on the horizontal line having the pixel 110 located thereon and/or the threshold voltage information of driving transistors M1 of the pixels 110 on the horizontal line having the pixel 110 located thereon are sensed, the pixel 110 supplies the degradation information of the OLEDs and/or the threshold voltage of the driving transistor M1 to the sensing unit 170 when a control signal is supplied to the control line CL1 during each of the display subframe period Pe and the black subframe period Pb. The driving method of the pixel 110 will be described in detail later.

Figure 4:
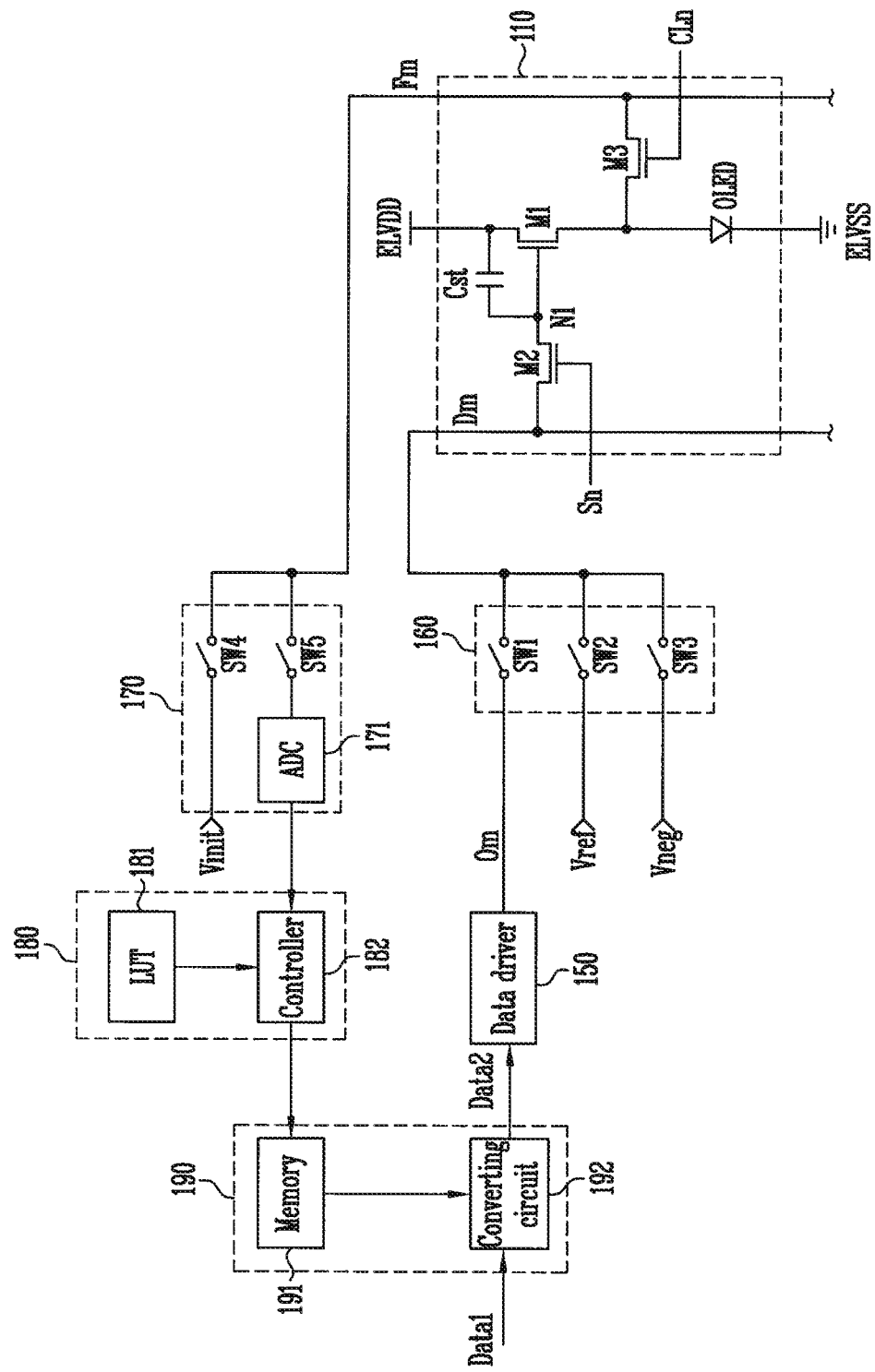
FIG. 4 is a circuit diagram showing a switching unit, a sensing unit, a control block and a timing controller of the embodiment of the present invention shown in FIG. 1.

FIG. 4 is a circuit diagram showing the switching unit, the sensing unit, the control block, and the timing controller of one embodiment according to the present invention shown in FIG. 1. For convenience of illustration, the configuration coupled to an $m^{th}$ data line Dm and an $m^{th}$ sensing line Fm is shown in FIG. 4.

Referring to FIG. 4, each channel of the switching unit 160 includes a first switch SW1 coupled between a data line Dm of the corresponding channel and an output line Om of the data driver 150, a second switch SW2 coupled between the data lines Dm and the reference voltage source Vref, and a third switch SW3 coupled between the data line Dm and the negative bias voltage source Vneg.

When a data signal is supplied to the pixel 110 through the data driver 150, the first switch SW1 is turned on. That is, the first switch maintains a turn-on state during a display subframe period Pe in which the organic light emitting display device displays an image.

The second switch SW2 is turned on during at least one period of a black subframe period Pb in which the threshold voltage information of the driving transistor M1 is sensed by the sensing unit 170 via the sensing line Fm.

The third switch SW3 is turned on every black subframe period Pb in which the threshold voltage information of the driving transistors M1 of pixels 110 on another horizontal line is sensed.

However, after it is sensed that the threshold voltages of the driving transistors M1 of the corresponding pixels 110 are deviated from the range of a reference threshold voltage (e.g., a predetermined reference threshold voltage) Vth,ref (shown in FIG. 8), the third switch SW3 is turned on every black subframe period Pb until the next black subframe period Pb in which the threshold voltage information of driving transistors M1 of a corresponding horizontal line is sensed.

That is, when it is sensed that the threshold voltage of the driving transistor M1 in the pixel 110 belongs within the range of the reference threshold voltage Vth,ref, the third switch SW3 may maintain a turn-off state until the period in which the threshold voltage information of driving transistors M1 of pixels 110 on a corresponding horizontal line is sensed (e.g., until the period returns).

Each of the channels of the sensing unit 170 includes a fourth switch SW4 coupled between a sensing line Fm of the corresponding channel and the initialization voltage source Vinit, a fifth switch SW5 coupled between the sensing line Fm and the control block 180, and an analog-digital converter ("ADC") 171 coupled between the fifth switch SW5 and the control block 180.

The fourth switch SW4 is turned on during an initial period of the black subframe period Pb in which the threshold voltage information of the driving transistor M1 is sensed by the sensing unit 170 via the sensing line Fm.

The fifth switch SW5 is turned on during one period of the black subframe period Pb in which the threshold voltage information of the driving transistor M1 is sensed. The fifth switch SW5 is not turned on simultaneously with the fourth switch SW4, but is turned on after the turn-on period of the fourth switch SW4.

The fifth switch SW5 is also turned on during one period of the display subframe period Pe in which the degradation information of the OLED is sensed by the sensing unit 170 via the sensing line Fm. At this time, the degradation information of the OLED is extracted by sensing the voltage at the anode electrode of the OLED.

The ADC 171 converts the voltage at the anode electrode of the OLED, which is supplied via the fifth switch SW5, into a first digital value during the display subframe period Pe in which the degradation information of the OLED is sensed.

The ADC 171 converts a voltage corresponding to the threshold voltage of the driving transistor M1, which is supplied via the fifth switch SW5, into a second digital value during the black subframe period Pb in which the threshold voltage information of the driving transistor M1 is sensed.

That is, the sensing unit 170 senses the voltage at the anode electrode of the OLED and the threshold voltage of the driving transistor M1 through the sensing line Fm, and converts them respectively into the first and second digital values to output the converted first and second digital values.

The control block 180 includes a lookup table (LUT) 181 in which a reference value for current versus voltage (I-V curve) of the OLED is stored and a controller 182 that extracts the degradation information of the OLED corresponding to the first digital value and sensed from the sensing unit 170 with reference to the lookup table (LUT) 181, transmits the extracted degradation information to the timing controller 190, and transmits the second digital value converted from the sensing unit 170 to the timing controller 190.

At this time, the controller 182 stores the degradation information of the OLED corresponding to the first digital value and the second digital value in a memory 191 included in the timing controller 190.

The timing controller 190 includes the memory 191 in which both the degradation information of the OLED and the threshold voltage information of the driving transistor M1 may be stored, and a converting circuit 192 that converts an externally inputted first data Data1 into a second data Data2 using the degradation information of the OLED and the threshold voltage information of the driving transistor M1, and outputs the converted second data Data2 to the data driver 150.

Here, both the degradation information of the OLED corresponding to the first digital value and the second digital value may be stored in the memory 191.

The converting circuit 192 converts a first data Data1 into a second data Data2 using the degradation information of the OLED and the threshold voltage information of the driving transistor M1 so that a degree of the degradation of the OLED and a drift of the threshold voltage of the driving transistor M1 can be compensated for.

The second data Data2 converted by the converting circuit 192 is supplied to the data driver 150. The data driver 150 generates a data signal corresponding to the second data Data2 and supplies the generated data signal to each of the pixels 110.

Accordingly, an image with uniform luminance may be displayed regardless of the degradation of the OLED and the drift of the threshold voltage of the driving transistor M1.

Hereinafter, the driving method of the organic light emitting display device according to one embodiment of the present invention, configured as described above, will be described in more detail.

Figure 5:
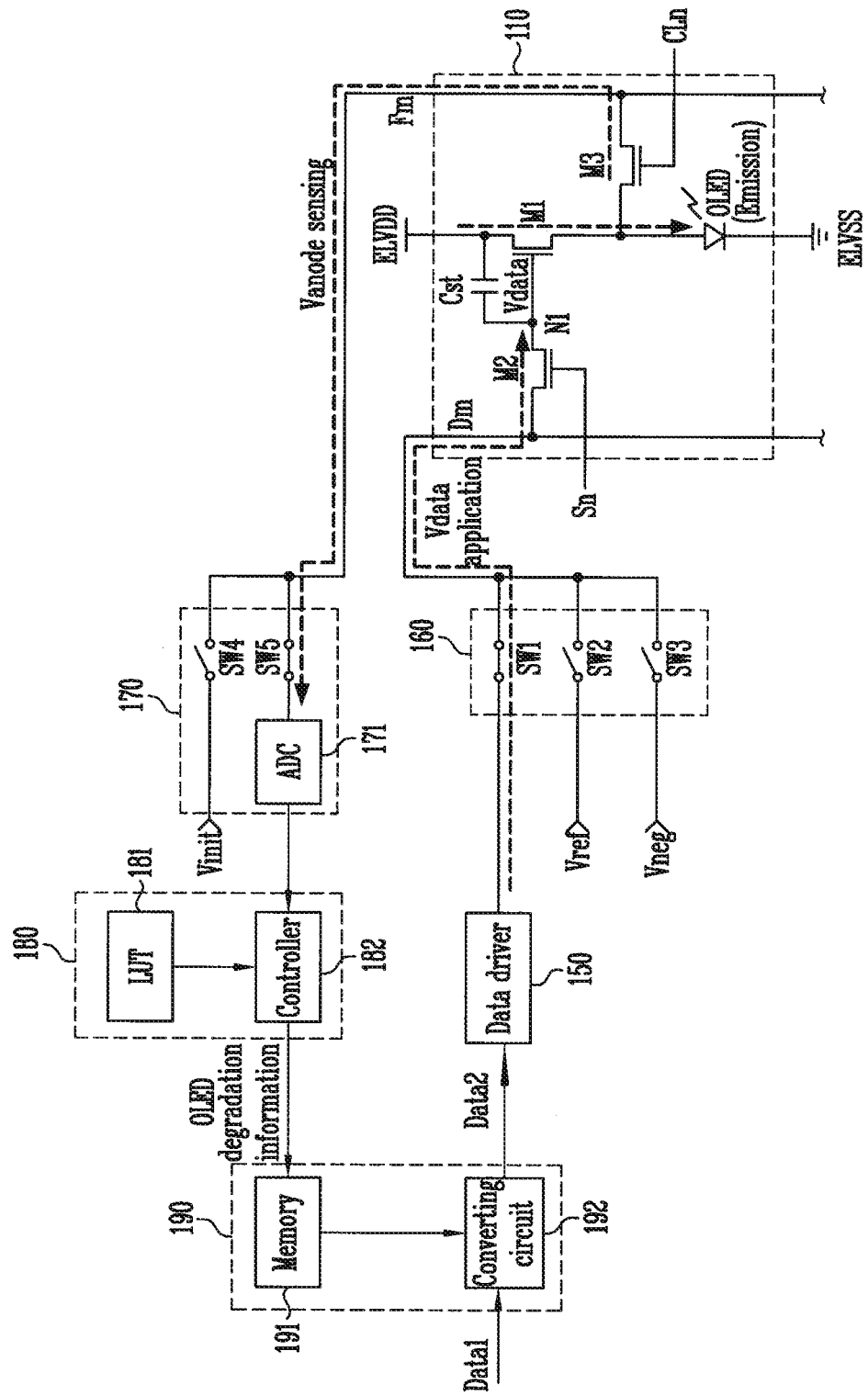
FIG. 5 is a circuit diagram illustrating an example of a method for sensing the degradation information of an OLED during a display subframe period corresponding to operation of the embodiment of the present invention shown in FIG. 1

FIG. 5 is a circuit diagram illustrating an example of a method for sensing the degradation information of an OLED during a display subframe period according to one embodiment of the present invention. Therefore, a pixel 110 on a horizontal line selected so that the degradation information of the OLED is extracted during a corresponding frame period 1F is shown in FIG. 5.

Referring to FIG. 5, the pixel 110 emits light with luminance corresponding to a data signal Vdata supplied during a display subframe period Pe, and a voltage Vanode applied to the anode electrode of the OLED is supplied to the sensing unit 170 by the third transistor M3 turned on during the display subframe period Pe so that the degradation information of the OLED is extracted.

More specifically, the data line Dm is coupled to the data driver 150 by the first switch SW1 turned on during the display subframe period Pe, and the second transistor M2 is turned on by a scan signal supplied to the scan line Sn.

Accordingly, the data signal Vdata supplied from the data driver 150 is applied to the first node N1 via the second transistor M2.

Then, a voltage corresponding to the data signal Vdata is charged in the storage capacitor Cst. Therefore, the voltage at the first node N1 is still maintained by the storage capacitor Cst after the second transistor M2 is turned off.

At this time, the driving transistor M1 supplies current corresponding to the voltage at the first node N1 to the OLED.

That is, the current corresponding to the data signal Vdata flows from the first power source ELVDD to the second power source ELVSS via the driving transistor M1 and the OLED.

Accordingly, the OLED emits light with luminance corresponding to the data signal Vdata.

The third transistor M3 is turned on by a control signal supplied from the control line CLn during the period in which the OLED emits light, and the fifth switch SW5 is turned on. At this time, the fifth switch SW5 may be controlled by the timing controller 190 or the like.

When the third transistor M3 and the fifth switch SW5 are turned on, the voltage Vanode applied to the anode electrode of the OLED is sensed by the sensing unit 170 while being supplied to the ADC 171.

Then, the ADC 171 converts the voltage Vanode applied to the anode electrode of the OLED into a first digital value and supplies the converted first digital value to the controller 182.

The controller 182 determines a degree of the degradation of the OLED using the degree changed from a reference voltage Vref with reference to the lookup table (LUT) 181 in which the reference value for current versus voltage (I-V curve) of the OLED may be stored, and stores degradation information of the OLED that is extracted from the degree of the degradation of the OLED in the memory 191.

At this time, as the OLED is degraded, the resistance of the OLED is changed, and therefore, the voltage Vanode applied to the anode electrode of the OLED is changed. Accordingly, the degradation information of the OLED can be extracted from the voltage Vanode applied to the anode electrode of the OLED.

The degradation information of the OLED that is stored in the memory 191 is used later to convert a first data Data1 into a second data Data2.

Figure 6A:
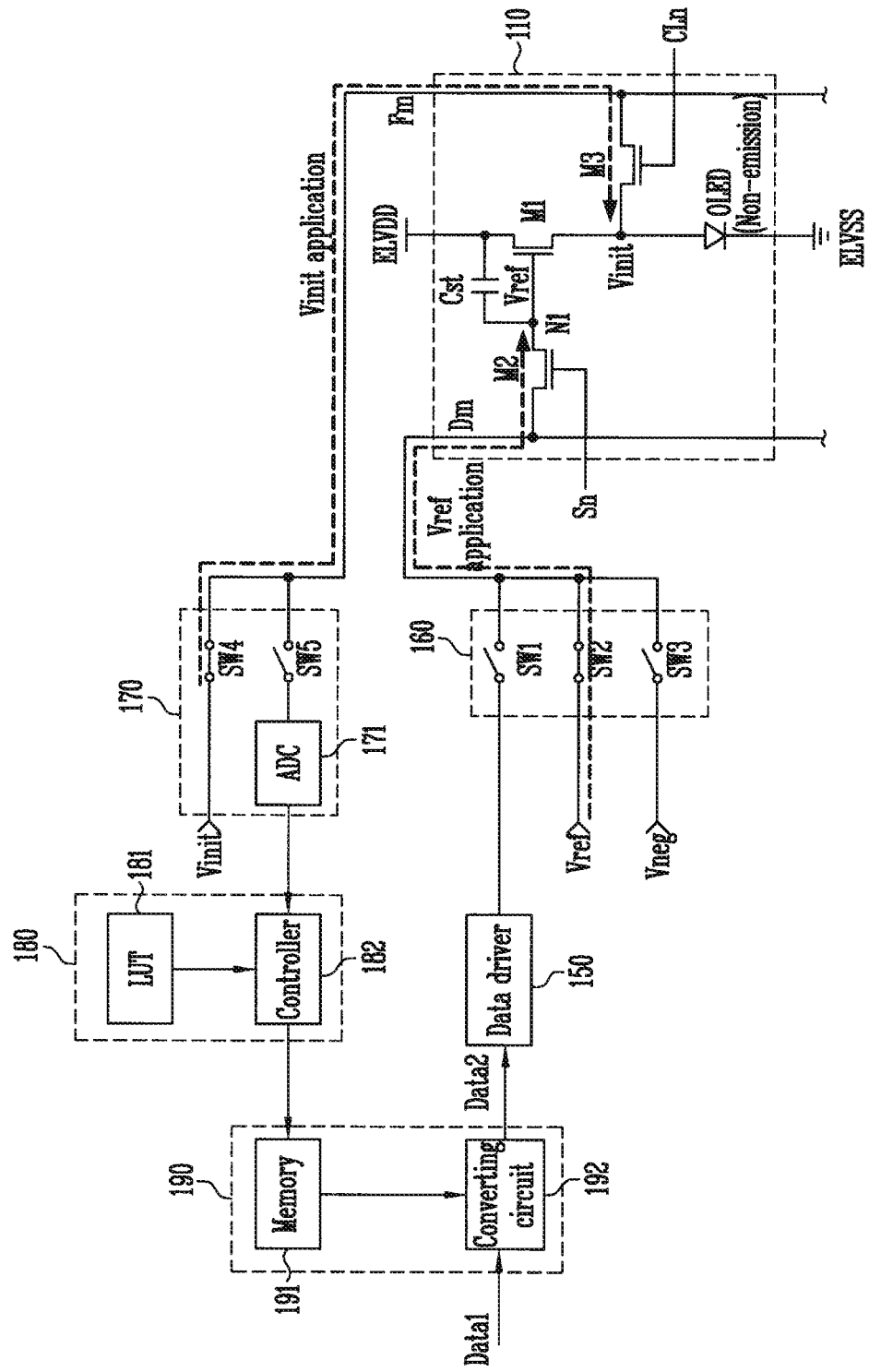
FIGS. 6A to 6C are circuit diagrams illustrating an example of a method for sensing the threshold voltage information of driving transistors of pixels on a horizontal line selected during a black subframe period.
Figure 6B:
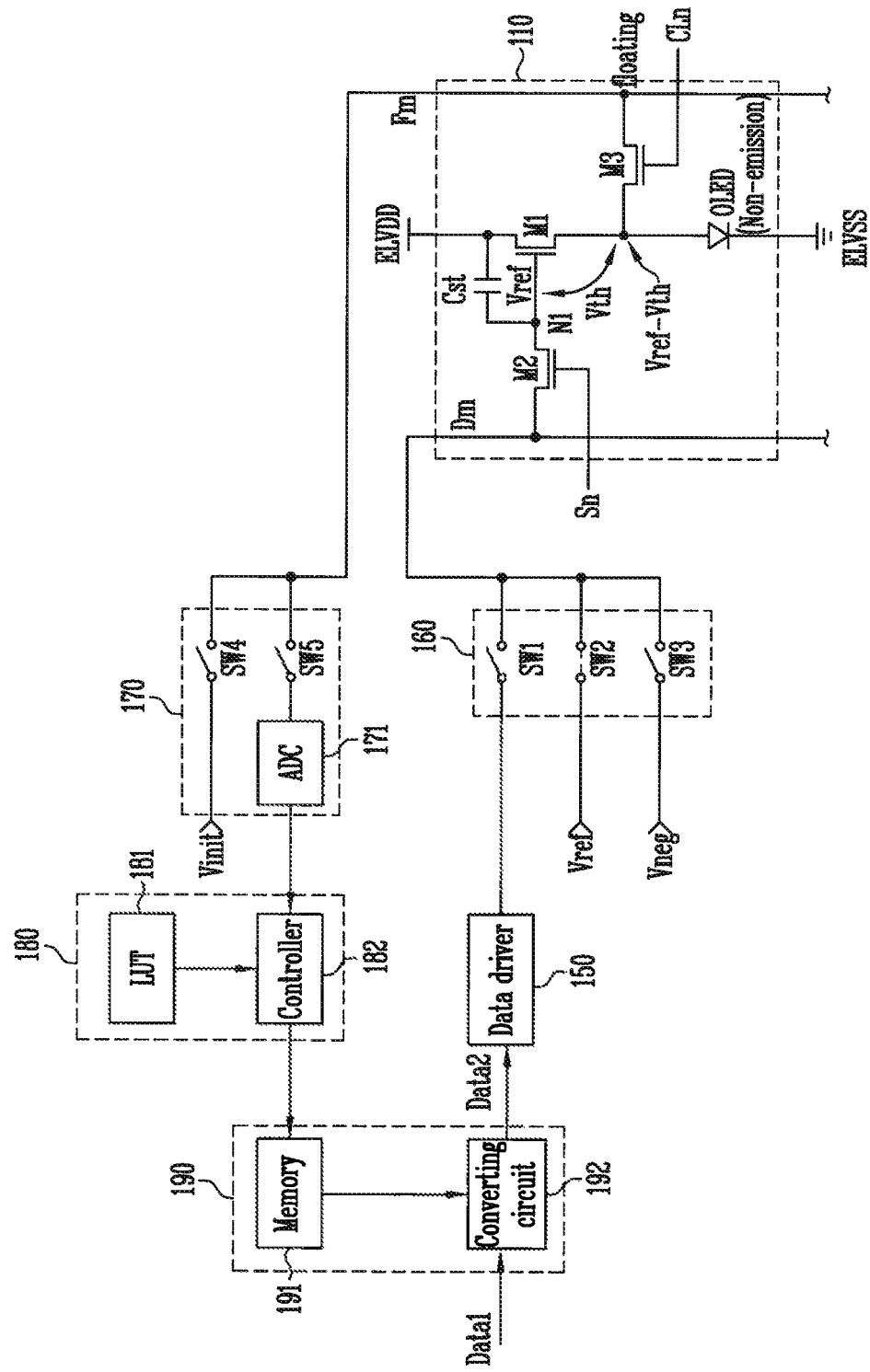
Figure 6C:
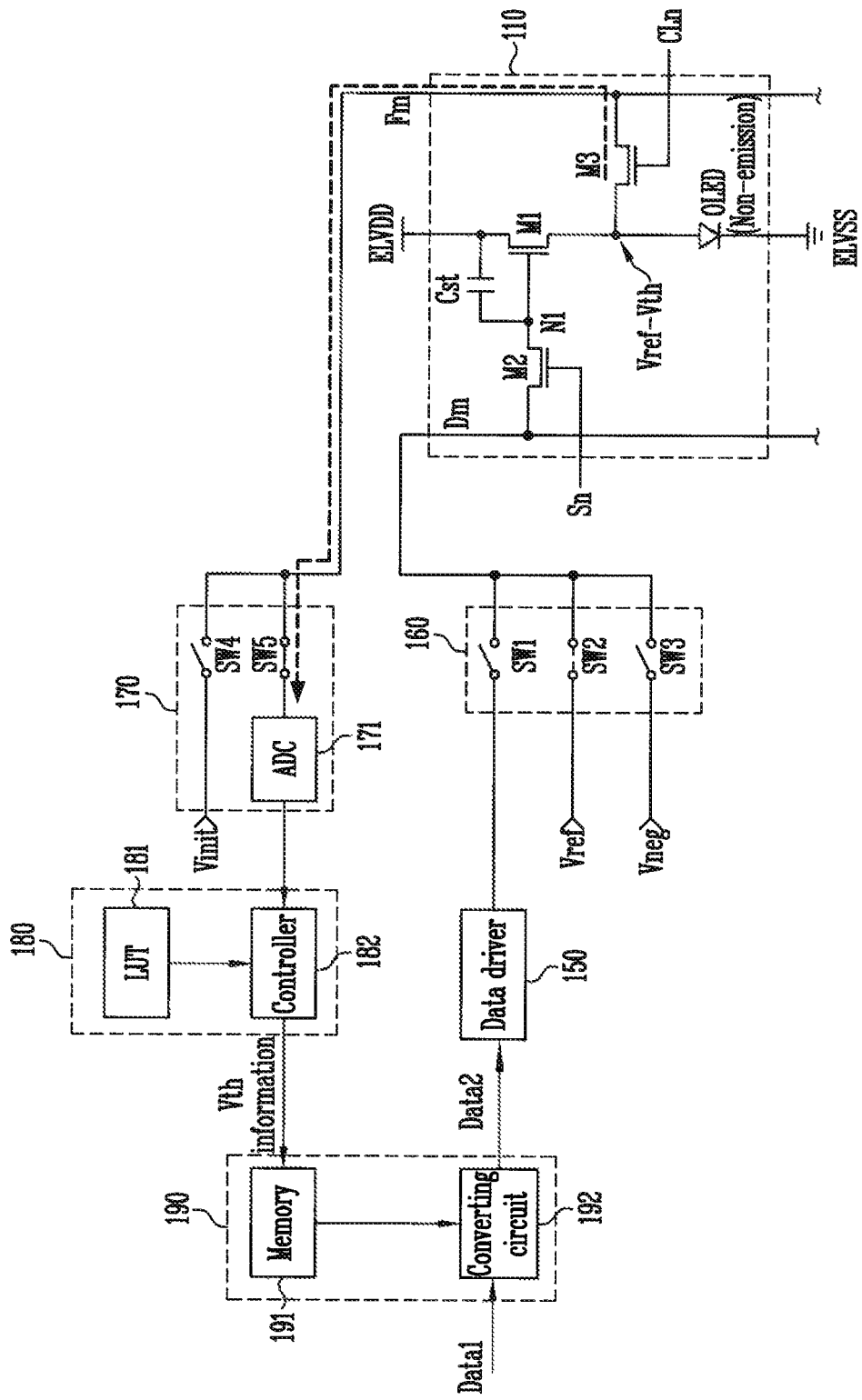

FIGS. 6A to 6C are circuit diagrams illustrating an example of a method for sensing the threshold voltage information of driving transistors M1 of the pixels 110 on a horizontal line selected during a black subframe period Pb according to one embodiment of the present invention. Therefore, the pixel 110 on a horizontal line selected so that the threshold voltage information of the driving transistor M1 is extracted during a corresponding frame period 1F is shown in FIGS. 6A to 6C.

Referring to FIG. 6A, during an initial period of the black subframe period Pb, the second and third transistors M2 and M3 are turned on by a scan signal supplied from the scan line Sn and a control signal supplied from the control line CLn, respectively, and the fourth switch SW4 coupled to the initialization voltage source Vinit is turned on.

Then, the voltage Vref of the reference voltage source and the voltage Vinit of the initialization voltage source are respectively supplied to the gate electrode (i.e., the first node N1) and the source electrode of the driving transistor M1 by the second and third transistors M2 and M3.

At this time, the voltage Vinit of the initialization voltage source is set to be lower than the voltage Vref of the reference voltage source by a value greater than the threshold voltage of the driving transistor M1. The voltage Vinit of the initialization voltage source and the voltage Vref of the reference voltage source are set within the range in which the OLED is not turned on during the black subframe period Pb so that the driving transistor M1 may be slightly turned on.

After the driving transistor M1 is slightly turned on, the source electrode of the driving transistor M1 or a sensing node coupled to the source electrode of the driving transistor M1 is floated as shown in FIG. 6B. To this end, the third transistor M3 and/or the fourth switch SW4 is turned off. Meanwhile, since the voltage applied to the first node N1 can be maintained by the storage capacitor Cst, the turn-off time of the second switch SW2 and/or the second transistor M2 can be freely determined as long as the voltage Vref of the reference voltage source is maintained at the first node N1 during the black subframe period Pb.

Then, the voltage at the source electrode of the driving transistor M1 is gradually increased, causing the difference between the voltage at the source electrode and the voltage Vref of the reference voltage source to become a value lower than the threshold voltage Vth of the driving transistor M1, and the driving transistor M1 is turned off.

That is, after the driving transistor M1 is slightly turned on, the source electrode of the driving transistor M1 is floated and then turned off when the difference between the voltages of the gate and source electrodes of the driving transistor M1 becomes the threshold voltage Vth of the driving transistor M1.

At this time, the voltage of the second power source ELVSS and a voltage lower than the threshold voltage (turn-on voltage) of the OLED are applied to the anode electrode of the OLED so that the OLED does not emit light.

That is, the voltage Vref of the reference voltage source is set to have a suitably low value so that the OLED is not turned on by the difference voltage Vref-Vth between the voltage Vref of the reference voltage source and the threshold voltage Vth of the driving transistor M1.

Thereafter, as shown in FIG. 6C, the third transistor M3 and the fifth switch SW5 are turned on, and the source electrode of the driving transistor M1 is coupled to the sensing unit 170 via the sensing line Fm, so that the threshold voltage information of the driving transistor M1 is sensed.

More specifically, the difference between the voltage Vref of the reference voltage source and the threshold voltage Vth of the driving transistor M1, i.e., Vref-Vth, is applied to the source electrode of the driving transistor M1. Since the voltage Vref of the reference voltage source is a fixed value, the threshold voltage information of the driving transistor M1 can be extracted.

The threshold voltage information of the driving transistor M1 may be inputted to the ADC 171.

Then, the ADC 171 converts the threshold voltage information of the driving transistor M1 into a second digital value and outputs the converted second digital value to the controller 182. The controller 182 stores the second digital value into the memory 191.

The threshold voltage information of the driving transistor M1, which may be stored in the memory 191, is used later to convert a first data Data1 into a second data Data2.

After the threshold voltage information of the driving transistor M1 is sensed, it is compared with a reference threshold voltage (e.g., a predetermined reference threshold voltage) Vth,ref, so that it can be determined whether or not the degradation of the driving transistor M1 is compensated for. This may be controlled by the timing controller 190 or a control circuit.

That is, when the threshold voltage Vth of the driving transistor M1, which may be sensed during the black subframe period Pb, is deviated from the range of the reference threshold voltage Vth,ref, a negative bias voltage Vneg is applied to the gate electrode of the driving transistor M1 every black subframe period Pb until a next period in which the threshold voltage of the driving transistor M1 on a corresponding horizontal line is sensed, thereby compensating for the degradation of the driving transistor M1.

Accordingly, the threshold voltage Vth of the driving transistor M1 is compensated for, to approach the reference threshold voltage Vth,ref. For example, the threshold voltage Vth of the driving transistor M1 can be compensated within the range of the reference threshold voltage Vth,ref by repeatedly applying the negative bias voltage Vneg to the gate electrode of the driving transistor M1.

Figure 7:
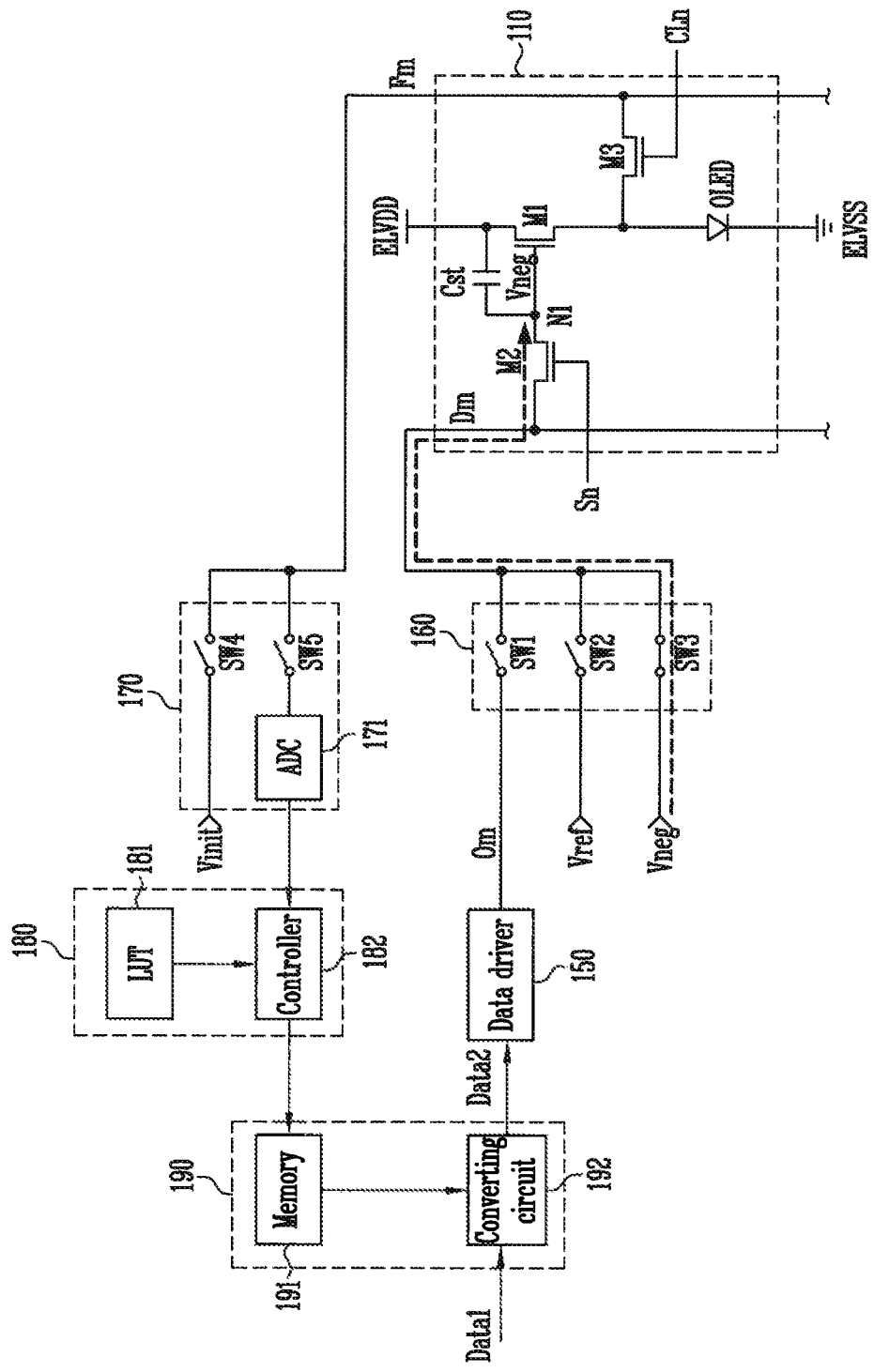
FIG. 7 is a circuit diagram illustrating a method for applying a negative bias voltage Vneg to gate electrodes of driving transistors of pixels on horizontal lines other than the selected horizontal line during the black subframe period.

FIG. 7 is a circuit diagram illustrating a method for applying a negative bias voltage Vneg to gate electrodes of driving transistors M1 of pixels 110 on the horizontal lines other than the pixels 110 on the selected horizontal line during the black subframe period Pb.

Referring to FIG. 7, the second transistor M2 of each of the pixels 110 on the horizontal lines other than pixels 110 on a horizontal line selected so that the degradation information of the OLED and the threshold voltage information of the driving transistor M1 are extracted during a corresponding frame period 1F is turned on in accordance with a scan signal supplied from the scan line Sn during the black subframe period Pb.

The third switch SW3 is turned on together with the second transistor M2.

Then, the voltage Vneg of the negative bias voltage source is applied to the first node N1 via the third switch SW3 and the second transistor M2.

The voltage Vneg of the negative bias voltage source is a negative bias voltage applied to the gate electrode of the driving transistor M1 so that the drift of the threshold voltage of the driving transistor M1 can be compensated for. The voltage Vneg of the negative bias voltage source may be determined based on the measured threshold voltage information of the driving transistor M1.

For example, when the driving transistor M1 is an N-type oxide thin film transistor, the voltage Vneg of the negative bias voltage source may be set as a negative voltage (e.g., a predetermined negative voltage).

As described above, when the degradation is compensated by applying a negative bias voltage Vneg to the gate electrode of the driving transistor M1, the threshold voltage of the driving transistor M1 is stabilized and the pixel 110 can be driven more stably.

However, the negative bias voltage Vneg is applied to the driving transistor M1 only when the previously sensed threshold voltage of the driving transistor M1 is deviated from the range of the reference threshold voltage (e.g., the range of the predetermined reference threshold voltage) Vth,ref.

If the previously sensed threshold voltage of the driving transistor M1 belongs within the range of the reference threshold voltage Vth,ref, only a turn-off voltage of the driving transistor M1 is applied (e.g., simply applied) to the gate electrode of the driving transistor M1 every black subframe period Pb until a next period in which the threshold voltage of the driving transistor M1 on the corresponding horizontal line is sensed.

The turn-off voltage of the driving transistor M1 may be supplied by the data driver 150 or may be supplied to the first node N1 by a turn-off voltage source and an additional switch coupled between the turn-off voltage source and the data line Dm.

Figure 8:
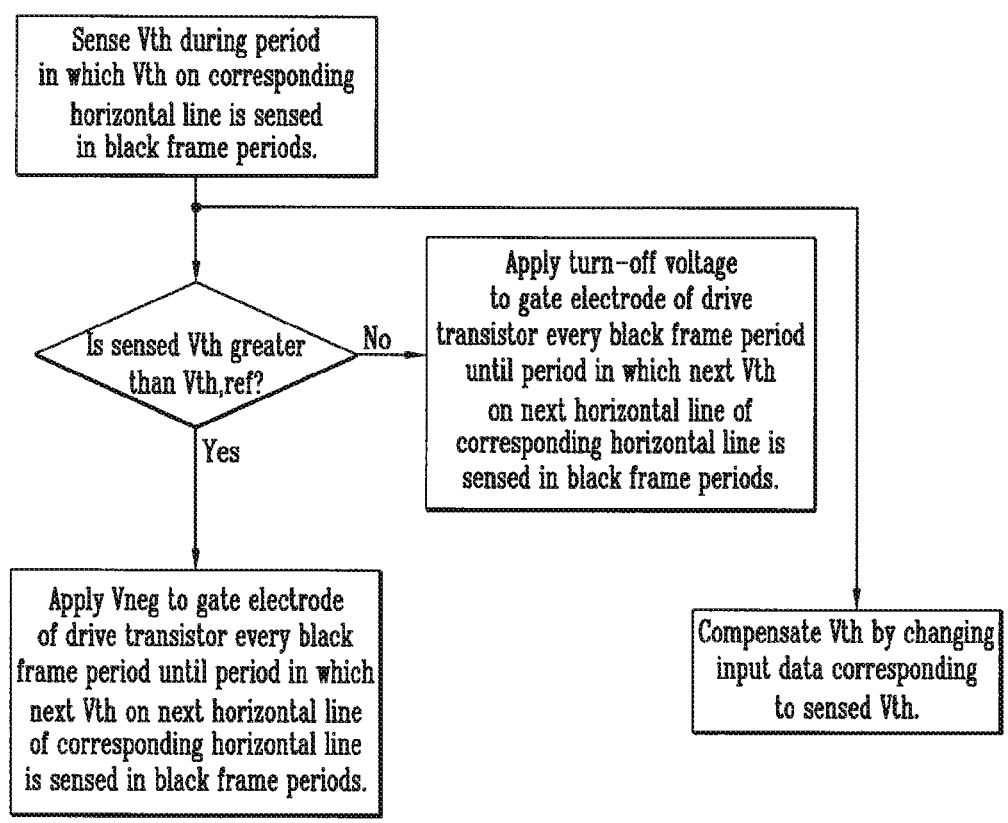
FIG. 8 is a flow diagram illustrating a method for compensating for the degradation of driving transistors according to one embodiment of the present invention.

FIG. 8 is a flow diagram illustrating a method for compensating for the degradation of driving transistors M1 according to one embodiment of the present invention.

Referring to FIG. 8, in order to compensate for the degradation of the driving transistors M1, the threshold voltage Vth of a driving transistor M1 of each of the pixels 110 located on a corresponding horizontal line is sensed during a period in which the threshold voltage Vth of driving transistors M1 on the corresponding horizontal line is in black subframe periods Pb.

The sensed threshold voltage Vth of the driving transistor M1 is compared with a reference threshold voltage (e.g., a predetermined reference threshold voltage) Vth,ref. To this end, a comparing circuit, a determining circuit, and/or the like may further be included in a control circuit unit such as the timing controller 190.

At this time, it is determined whether or not the threshold voltage Vth of the driving transistor M1 belongs within the range of the reference threshold voltage Vth,ref.

For example, when the driving transistor M1 is an N-type transistor, it is determined that the sensed threshold voltage Vth of the driving transistor M1 is deviated from the range of the reference threshold voltage Vth,ref, when the sensed threshold voltage Vth of the driving transistor M1 is greater than the reference threshold voltage Vth,ref. When the sensed threshold voltage Vth of the driving transistor M1 is less than or equal to the reference threshold voltage Vth,ref, it is determined that the sensed threshold voltage Vth of the driving transistor M1 belongs within the range of the reference threshold voltage Vth,ref.

Therefore, it is assumed that the driving transistor M1 is an N-type transistor. When the sensed threshold voltage Vth of the driving transistor M1 is greater than the reference threshold voltage Vth,ref, the voltage Vneg of the negative bias voltage source is applied to the gate electrode of the driving transistor M1 every black subframe period Pb until the next period in which the threshold voltage Vth of the driving transistor M1 on the corresponding horizontal line is sensed in the black subframe periods Pb. Accordingly, the degradation of the driving transistor M1 can be compensated for.

When the sensed threshold voltage Vth of the driving transistor M1 is less than or identical to the reference threshold voltage Vth,ref, only a turn-off voltage is applied (e.g., simply applied) to the gate electrode of the driving transistor M1 every black subframe period Pb until the period in which the threshold voltage Vth of the driving transistor M1 on the corresponding horizontal line is sensed in the black subframe periods Pb.

Meanwhile, the sensed threshold voltage Vth of the driving transistor M1 is used not only to compensate for the degradation of the driving transistor M1, but, as described above, the sensed threshold voltage Vth of the driving transistor M1 is also used to compensate for the threshold voltage Vth of the driving transistor M1 by changing an input data of the timing controller.

That is, a first data Data1 is converted into a second data Data2 corresponding to the sensed threshold voltage Vth of the driving transistor M1, so that an image with uniform luminance can be displayed regardless of the drift of the threshold voltage Vth of the driving transistor M1.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An organic light emitting display device coupled between a first power source and a second power source, the organic light emitting display comprising:
   a display unit having a plurality of pixels located at crossing regions of scan lines, control lines, data lines and sensing lines, each of the pixels comprising an organic light emitting diode and a driving transistor coupled between the first power source and the organic light emitting diode and having a gate electrode coupled to a first node;
   a scan driver configured to supply scan signals to the scan lines;
   a control line driver configured to supply control signals to the control lines;
   a data driver configured to supply data signals to the data lines;
   a switching unit configured to selectively electrically couple the data lines to output lines of the data driver, a reference voltage source, or a negative bias voltage source;
   a sensing unit configured to sense degradation information of the organic light emitting diode and threshold voltage information of the driving transistor through the sensing lines;
   a control block configured to store the degradation information of the organic light emitting diode and the threshold voltage information of the driving transistor, sensed by the sensing unit; and
   a timing controller configured to generate second data by converting externally supplied first data using the degradation information of the organic light emitting diode and the threshold voltage information of the driving transistor and to supply the second data to the data driver, wherein one frame period is divided into a display subframe period and a black subframe period, during the display subframe period, an image is displayed corresponding to a corresponding data signal of the data signals generated from the second data, and the degradation information of the organic light emitting diode of each of the pixels on a selected horizontal line is sensed, and during the black subframe period, the threshold voltage information of the driving transistor of each of the pixels on the selected horizontal line is sensed, and a negative bias voltage of the negative bias voltage source or a turn-off voltage of the driving transistor is supplied to the gate electrode of the driving transistor of each of the pixels on other horizontal lines,
   wherein each of the pixels further comprises:
      a second transistor coupled between the first node and a corresponding data line of the data lines, the second transistor having a gate electrode coupled to a corresponding scan line of the scan lines;
      a storage capacitor coupled between the first node and the first power source; and
      a third transistor coupled between an anode electrode of the organic light emitting diode and a corresponding sensing line of the sensing lines, the third transistor having a gate electrode coupled to a corresponding control line of the control lines.

2. The organic light emitting display device according to claim 1, wherein each of the pixels emits light with luminance corresponding to the corresponding data signal supplied during the display subframe period, and the third transistor of each of the pixels on the selected horizontal line is turned on in response to a corresponding control signal of the control signals supplied from the corresponding control line during the display subframe period, and a voltage applied to the anode electrode of the organic light emitting diode via the third transistor is applied to the sensing unit.

3. The organic light emitting display device according to claim 1, wherein the second transistor and the third transistor of each of the pixels on the selected horizontal line are turned on in response to a corresponding scan signal of the scan signals and a corresponding control signal respectively supplied from the scan lines and the control lines during the black subframe period so that the driving transistor is turned on by respectively supplying a reference voltage of the reference voltage source and an initialization voltage of an initialization voltage source to the gate electrode and a source electrode of the driving transistor and after the driving transistor is turned on, the source electrode of the driving transistor is floated and then coupled to the sensing unit via the corresponding sensing line by the third transistor after a difference between voltages of the gate electrode and the source electrode of the driving transistor becomes a threshold voltage of the driving transistor.

4. The organic light emitting display device according to claim 3, wherein a difference between the initialization voltage of the initialization voltage source and the reference voltage of the reference voltage source is greater than the threshold voltage of the driving transistor.

5. The organic light emitting display device according to claim 3, wherein a voltage lower than that obtained by adding a voltage of the second power source and a threshold voltage of the organic light emitting diode is applied to the anode electrode of the organic light emitting diode during the black subframe period.

6. The organic light emitting display device according to claim 1, wherein the second transistor of each of the pixels on horizontal lines other than the selected horizontal line is configured to be turned on corresponding to a corresponding scan signal of the scan signals supplied from the corresponding scan line during the black subframe period so that the voltage of the negative bias voltage source or the turn-off voltage of the driving transistor is applied to the first node.

7. The organic light emitting display device according to claim 1, wherein the driving transistor is an N-type oxide thin film transistor.

8. The organic light emitting display device according to claim 7, wherein the voltage of the negative bias voltage source is a negative voltage.

9. An organic light emitting display device coupled between a first power source and a second power source, the organic light emitting display comprising:
a display unit having a plurality of pixels located at crossing regions of scan lines, control lines, data lines and sensing lines, each of the pixels comprising an organic light emitting diode and a driving transistor coupled between the first power source and the organic light emitting diode and having a gate electrode coupled to a first node;
a scan driver configured to supply scan signals to the scan lines;
a control line driver configured to supply control signals to the control lines;
a data driver configured to supply data signals to the data lines;
a switching unit configured to selectively electrically couple the data lines to output lines of the data driver, a reference voltage source, or a negative bias voltage source;
a sensing unit configured to sense degradation information of the organic light emitting diode and threshold voltage information of the driving transistor through the sensing lines;
a control block configured to store the degradation information of the organic light emitting diode and the threshold voltage information of the driving transistor, sensed by the sensing unit; and
a timing controller configured to generate second data by converting externally supplied first data using the degradation information of the organic light emitting diode and the threshold voltage information of the driving transistor and to supply the second data to the data driver, wherein one frame period is divided into a display subframe period and a black subframe period, during the display subframe period, an image is displayed corresponding to a corresponding data signal of the data signals generated from the second data, and the degradation information of the organic light emitting diode of each of the pixels on a selected horizontal line is sensed, and during the black subframe period, the threshold voltage information of the driving transistor of each of the pixels on the selected horizontal line is sensed, and a negative bias voltage of the negative bias voltage source or a turn-off voltage of the driving transistor is supplied to the gate electrode of the driving transistor of each of the pixels on other horizontal lines,
wherein a channel of the switching unit comprises;
a first switch coupled between a corresponding data line of the data lines and an output line of the data driver;
a second switch coupled between the corresponding data line and the reference voltage source; and
a third switch coupled between the corresponding data line and the negative bias voltage source.

10. The organic light emitting display device according to claim 9, wherein the first switch is turned on during the display subframe period in which the corresponding data signal is supplied to the pixels.

11. The organic light emitting display device according to claim 9, wherein the second switch is turned on during the black subframe period in which the threshold voltage information of the driving transistor is sensed.

12. The organic light emitting display device according to claim 9, wherein after it is sensed that the threshold voltage of the driving transistor is deviated from a range of a reference threshold voltage, the third switch is turned on every black subframe period until the black subframe period in which the threshold voltage information of the driving transistor of the pixel including the third switch is sensed.

13. The organic light emitting display device according to claim 9, wherein after it is determined that the sensed threshold voltage of the driving transistor is within a range of a reference threshold voltage, the third switch is turned off every black subframe period until the black subframe period in which the threshold voltage information of the driving transistor of the pixel including the third switch is sensed.

14. An organic light emitting display device coupled between a first power source and a second power source, the organic light emitting display comprising:

a display unit having a plurality of pixels located at crossing regions of scan lines, control lines, data lines and sensing lines, each of the pixels comprising an organic light emitting diode and a driving transistor coupled between the first power source and the organic light emitting diode and having a gate electrode coupled to a first node;

a scan driver configured to supply scan signals to the scan lines;

a control line driver configured to supply control signals to the control lines;

a data driver configured to supply data signals to the data lines;

a switching unit configured to selectively electrically couple the data lines to output lines of the data driver, a reference voltage source, or a negative bias voltage source;

a sensing unit configured to sense degradation information of the organic light emitting diode and threshold voltage information of the driving transistor through the sensing lines;

a control block configured to store the degradation information of the organic light emitting diode and the threshold voltage information of the driving transistor, sensed by the sensing unit; and a timing controller configured to generate second data by converting externally supplied first data using the degradation information of the organic light emitting diode and the threshold voltage information of the driving transistor and to supply the second data to the data driver, wherein one frame period is divided into a display subframe period and a black subframe period, during the display subframe period, an image is displayed corresponding to a corresponding data signal of the data signals generated from the second data, and the degradation information of the organic light emitting diode of each of the pixels on a selected horizontal line is sensed, and during the black subframe period, the threshold voltage information of the driving transistor of each of the pixels on the selected horizontal line is sensed, and a negative bias voltage of the negative bias voltage source or a turn-off voltage of the driving transistor is supplied to the gate electrode of the driving transistor of each of the pixels on other horizontal lines, wherein a channel of the sensing unit comprises:
a fourth switch coupled between a corresponding sensing line of the sensing lines and an initialization voltage source;
a fifth switch coupled between the corresponding sensing line and the control block; and
an analog-digital converter (ADC) coupled between the fifth switch and the control block, and wherein the fifth switch is turned on after a turn-on period of the fourth switch during the black subframe period in which the threshold voltage information of the driving transistor is sensed, and remains turned on during the display subframe period in which the degradation information of the organic light emitting diode is sensed by the sensing unit via the corresponding sensing line.

15. An organic light emitting display device coupled between a first power source and a second power source, the organic light emitting display comprising:

a display unit having a plurality of pixels located at crossing regions of scan lines, control lines, data lines and sensing lines, each of the pixels comprising an organic light emitting diode and a driving transistor coupled between the first power source and the organic light emitting diode and having a gate electrode coupled to a first node;

a scan driver configured to supply scan signals to the scan lines;

a control line driver configured to supply control signals to the control lines;

a data driver configured to supply data signals to the data lines;

a switching unit configured to selectively electrically couple the data lines to output lines of the data driver, a reference voltage source, or a negative bias voltage source;

a sensing unit configured to sense degradation information of the organic light emitting diode and threshold voltage information of the driving transistor through the sensing lines;

a control block configured to store the degradation information of the organic light emitting diode and the threshold voltage information of the driving transistor, sensed by the sensing unit;

a timing controller configured to generate second data by converting externally supplied first data using the degradation information of the organic light emitting diode and the threshold voltage information of the driving transistor and to supply the second data to the data driver, wherein one frame period is divided into a display subframe period and a black subframe period, during the display subframe period, an image is displayed corresponding to a corresponding data signal of the data signals generated from the second data, and the degradation information of the organic light emitting diode of each of the pixels on a selected horizontal line is sensed, and during the black subframe period, the threshold voltage information of the driving transistor of each of the pixels on the selected horizontal line is sensed, and a negative bias voltage of the negative bias voltage source or a turn-off voltage of the driving transistor is supplied to the gate electrode of the driving transistor of each of the pixels on other horizontal lines, wherein the sensing unit is configured to sense a voltage at an anode electrode of the organic light emitting diode and the threshold voltage of the driving transistor through the sensing lines, and to output them respectively as a first digital value and a second digital value to the control block, and wherein the control block comprises:
a lookup table configured to store a reference value for current versus voltage of the organic light emitting diode; and
a controller configured to extract the degradation information of the organic light emitting diode corresponding to the first digital value sensed from the sensing unit with reference to the lookup table to transmit the degradation information to the timing controller and transmit the second digital value to the timing controller.

* * * * *